United States Patent [19]
Voss et al.

[11] Patent Number: 4,577,589
[45] Date of Patent: Mar. 25, 1986

[54] WIRE BASKET BIRD CAGE WHICH CAN BE ASSEMBLED FROM WIRE GRATING PARTS

[76] Inventors: Josef Voss, Haus Dreizehneichen, 5760 Arnsberg 1; Gilles Thévenot, Schlossbergstrasse 2, 7570 Baden-Baden, both of Fed. Rep. of Germany

[21] Appl. No.: 673,559
[22] PCT Filed: Sep. 6, 1983
[86] PCT No.: PCT/EP83/00235
§ 371 Date: Nov. 9, 1984
§ 102(e) Date: Nov. 9, 1984
[87] PCT Pub. No.: WO84/03814
PCT Pub. Date: Oct. 11, 1984

[30] Foreign Application Priority Data

Apr. 7, 1983 [DE] Fed. Rep. of Germany ....... 3312474

[51] Int. Cl.⁴ .............................................. A01K 31/00
[52] U.S. Cl. ........................................... 119/17; 220/6
[58] Field of Search ...................... 119/17, 18, 19, 23; 220/4 R, 4 F, 6

[56] References Cited

U.S. PATENT DOCUMENTS

| | | | |
|---|---|---|---|
| 1,588,282 | 6/1926 | Walhsman | 119/17 |
| 3,195,505 | 7/1965 | Hauth et al. | 119/17 |
| 3,352,287 | 11/1967 | Klingberg | 119/17 |
| 3,499,674 | 3/1970 | Voran et al. | 119/17 |
| 3,970,209 | 7/1976 | Baxter | 220/6 |

FOREIGN PATENT DOCUMENTS 2842698  3/1980  Fed. Rep. of Germany ........ 119/17

Primary Examiner—Jay N. Eskovitz
Attorney, Agent, or Firm—Michael J. Striker

[57] ABSTRACT

The wire basket bird cage can be assembled from wire grating parts, namely from two flat walls (1) lying opposite one another, two curved or bent walls (2) and a curved or bent roof (3). The walls are joined together by individual connecting parts (20) made of plastic, each with a groove with a catch opening surrounding one wire of the wall. A shoulder part (10) made of a solid plastic is provided for connecting the roof to a curved wall, the shoulder part having an edge (11) to which the roof is attached and an edge (14) to which the curved side wall is attached. A plurality of connecting elements are formed in the area of this edge, each with a groove which receives a wire and with a downwardly directed catch opening for locking the wire into place. The individual pieces can be shipped in a shallow carton. The user of the cage can assemble it into a stable body simply.

2 Claims, 12 Drawing Figures

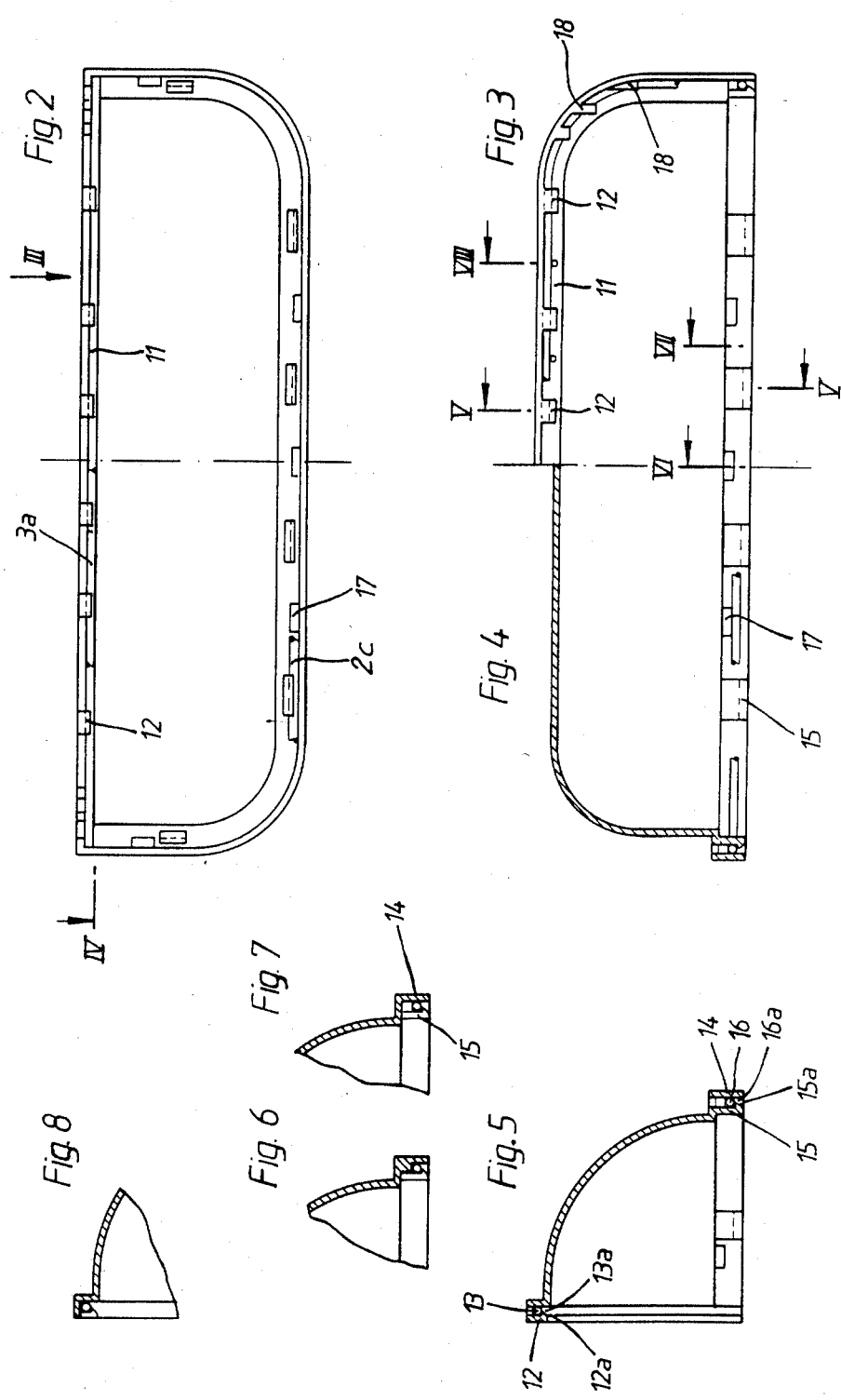

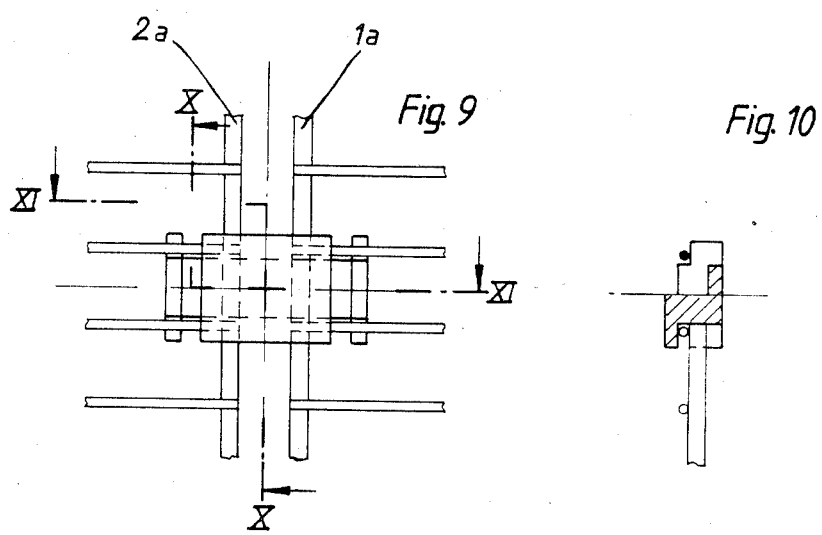
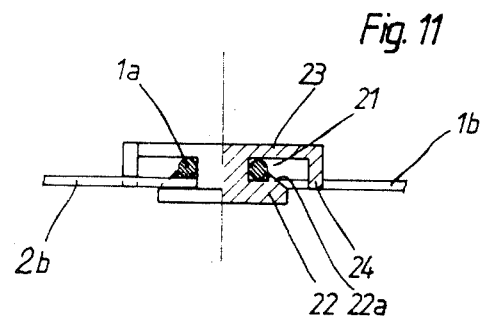

WIRE BASKET BIRD CAGE WHICH CAN BE ASSEMBLED FROM WIRE GRATING PARTS

The invention relates to a wire basket bird cage, which the user puts together himself after receiving the individual parts together with the tray, which forms the lower part of the cage, in a shallow cardboard box.

Various embodiments of this type of wire bird cage are known from the prior art listed herebelow; however, none of these known embodiments was able to gain a foothold on the market. The reason for this lies in the fact that with the known embodiments the connecting elements for the wire grating are so complicated that a non-expert cannot be expected to manipulate them, or that the stability of the assembled wire basket leaves something to be desired. The following state of the art has been cited:

| | |
|---|---|
| German OS | 26 50 901 |
| U.S. Pat. No. | 32 23 274 |
| U.S. Pat. No. | 33 52 287 |
| U.S. Pat. No. | 37 42 909 |
| French patent application (publication No. 23 45 074) | 76 09 421 |

The object of the invention is to develop a wire basket bird cage of the above kind in line with market trends.

The solution is given by the features of the patent claims.

The space of the plastic tray is for the most part sufficient for accomodating the individual parts of such a wire basket. Basically, the package needs to be measured only for the size of the tray. When the user has received the individual parts of the wire basket, he joins the grating parts of the walls to the vertical joints with the aid of individual connecting parts made of plastic simply by pressing the wire at the edge of the respective grating part into the groove (slot) provided on the connecting part. The cage can be delivered with the two shoulder parts already connected to the grating part for the roof. The user then only needs to connect the shoulder parts to the curved or bent side parts, again by pressing the wire at the edge into the moulded connecting elements.

This results in a stable body since the moulded or individual connecting parts made of plastic hold the wires firmly in a snug manner. The shoulder parts made of solid plastic contribute substantially to the stability, particularly, since they are curved concavely, i.e. are reinforced in three dimensions.

The wire grating parts can be manufactured economically from rectangular or square wiremesh mats. Special designs are not necessary. The following preferred embodiments of the invention are provided. The connecting between the shoulder parts and the roof can also occur via formed, attachable connecting parts. If the respective groove openings of the formed connecting parts are directed downwardly, then the connection can be carried out by pressing the shoulder part onto the vertically disposed grating part. Stability can be increased by means of further formed elements. The grating parts connected to the shoulder parts can be curved or bent. They can also be of several pieces, whereby the connection in each case is established by individual connecting parts according to the invention. According to the invention, any cage layout can be constructed. The formed connecting parts are preferably designed in such a way that the connection can be easily established by pressing in the wire, whereas pulling out the wire is made more difficult.

The exemplary embodiments of the invention are described in greater detail herebelow with reference to the drawings wherein FIG. 1 shows in perspective an assembled wire basket bird cage according to the invention;

FIG. 2 shows a shoulder part of this wire basket as seen from below;

FIG. 3 shows a view of this shoulder part in the direction of arrow III in FIG. 2;

FIG. 4 is a section along IV in FIG. 2;

FIG. 5 is a section along V in FIG. 3;

FIG. 6 is a section according to VI in FIG. 3;

FIG. 7 is a section along VII in FIG. 3;

FIG. 8 is a section along VIII in FIG. 3;

FIG. 9 is a top view of an individual connecting piece;

FIG. 10 is a section along X-X in FIG. 9;

FIG. 11 is a section along XI-XI in FIG. 9;

Figure 1:
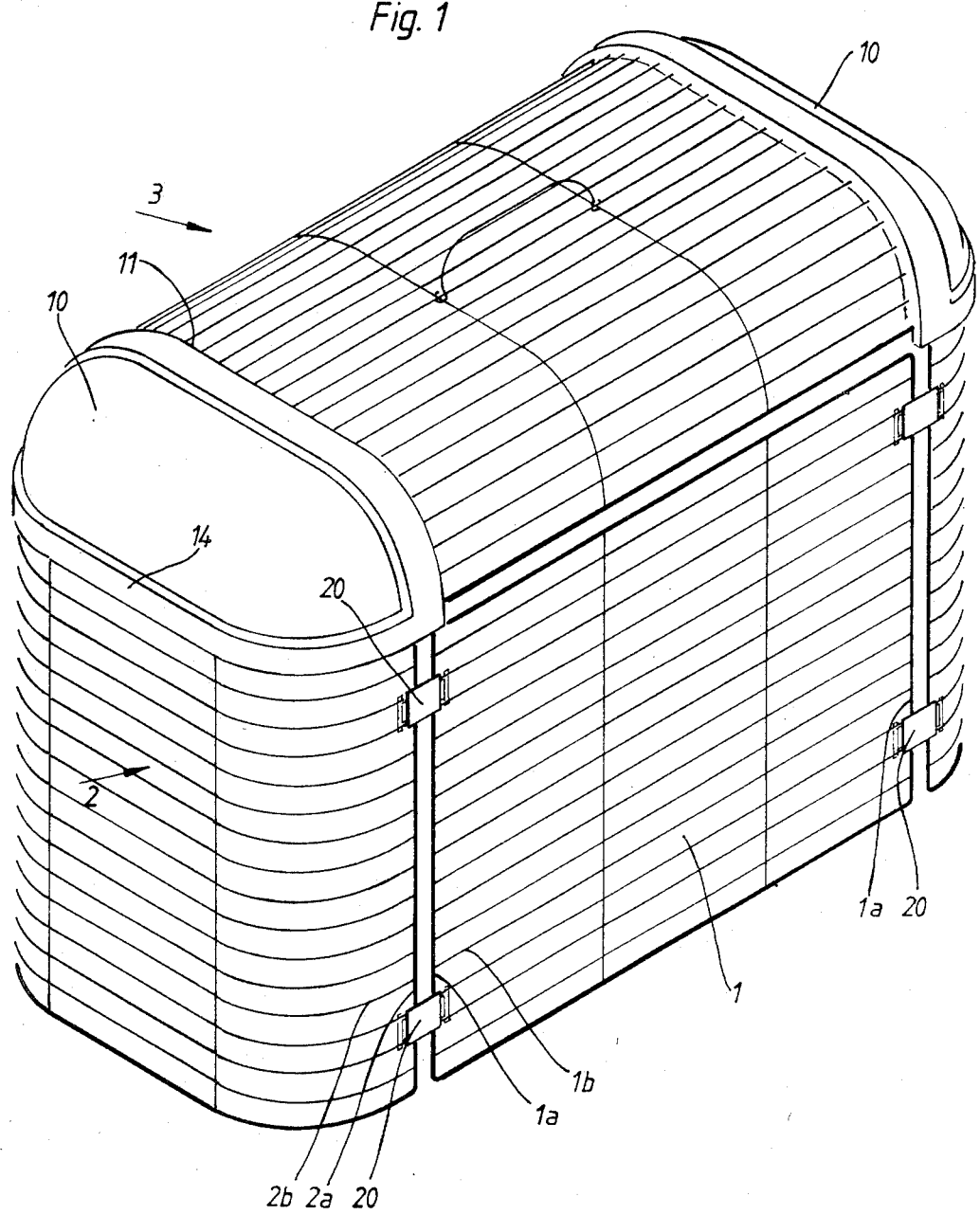

FIG. 1 is described first. The wire basket illustrated forms the upper part of a bird cage. The lower part is formed by a plastic tray not illustrated, as known per se, which is connected to the wire basket by easily releasable connecting means.

The wire basket is assembled from five wire grating parts and two shoulder parts 10. There are two flat grating parts 1 of rectangular or square shape and two curved grating parts 2. On each side one grating part 1 and one grating part 2 are joined by two individual connecting pieces 20. The grating piece 3 which forms the roof is curved. Part 3 and parts 2 lying opposite one another are connected in each case by a shoulder part 10 made of plastic. This shoulder part is provided with an edge 11 on the roof and an edge 14 on the sides. The shape of the edges are respectively adapted to the roof or the grafting part 2. The edge is in each case connected to the corresponding grating piece. The flat grating parts 1 are limited at the vertical edges by wires 1a to which thinner wires 1b are attached at right angles. In the same manner the grating parts 2 are limited at the side by wires 2a and at the top by wires 2c to which the thinner wires 2b are attached. The roof 3 is likewise limited at the side by thicker wires, namely at the curved side by a wire 3a.

The shoulder parts 10, illustrated in FIGS. 2 to 5, are made of plastic. An edge 11 or 14 is formed at the roof and the wall. As can be seen in FIG. 2, the connecting elements are formed under the flat part of the edge at the roof. There are six pieces which serve to establish with the wire 3a a catch connection which can be pressed in. In each case a groove 13 is formed by the connecting parts which surrounds the wire 3a on three sides and which has an opening 13a at the bottom into which the wire can be pressed. On the one side the groove is limited by an elastic cross-piece 12. A barb 12a is formed onto the cross-piece which cannot be pulled out easily.

In principle, the same connecting elements are formed in the area of the wall edge 44 with cross-pieces 16 on which barbs 15a are formed and with grooves 16 having downwardly directed groove openings 16a for pressing in the wire 2c. In the area of the edge 14 there are also stops 17 against which the wire 2c abuts from below.

In the area of edge 11 where there are curves the wire 3a is held firmly by moulded cross-pieces 18. In the individual connecting part according to FIGS. 9 to 11, two grooves 21 are formed side-by-side behind a plate, each groove accommodating one wire 1a and 2a. So that the wire can be pressed in, elastic cross-pieces 22 and 23 are provided with barbs 22a so that the wire cannot be pulled out again. A cross-piece 23 is allocated to each groove opposite the plate with two abutments 24 which respectively support the attached wires 1b and 2b.

Figure 12:
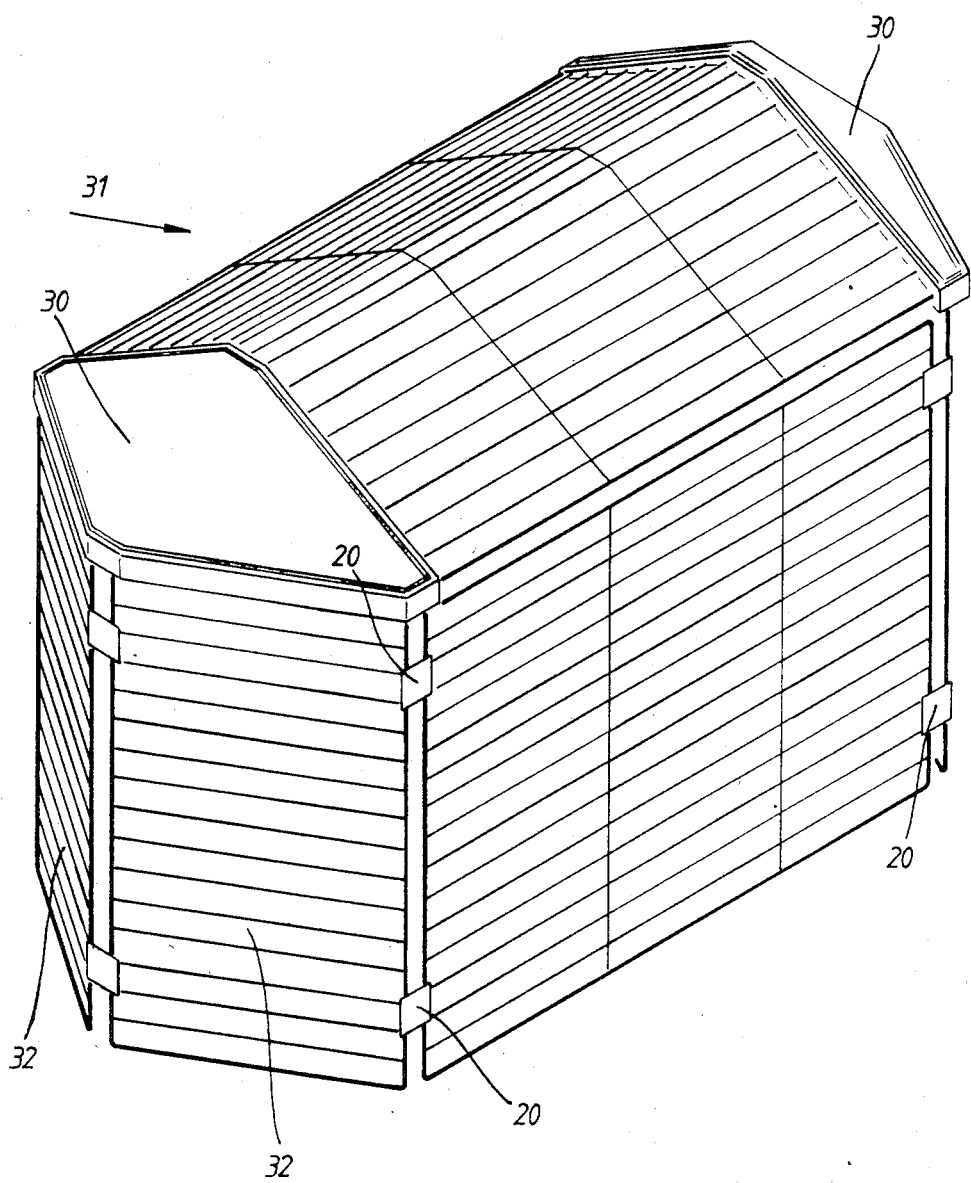
FIG. 12 shows in perspective a further embodiment of a wire basket according to the invention.

In the wire basket according to FIG. 12, shoulder parts 30 are provided for connecting a bent roof 31 to two walls 32 which are each flat but joined together in a bent arrangement. In the bend the walls are respectively connected by individual connecting parts in the design according to FIGS. 9 to 11, whereby, however, the connecting part 20 is adjusted accordingly to the bend.

We claim:

1. A wire basket bird cage which can be assembled from wire grating parts, characterized by the following features:

it includes two equal wall grating parts lying opposite one another, two further equal wall grating parts lying opposite one another and joined to said first wall grating parts, and one roof grating part;

the wall grating parts are connected to one another by cliplike connecting parts;

at the connecting parts grooves are formed, which insertably accomodate the vertical wires of the wall grating parts, and abutments are formed for the horizontal wires, characterized by the following further features:

a solid shoulder part (10) is provided for the connection of the roof to each grating part (2) being attached to the flat walls (1);

each shoulder part has a curved edge (11) on the roof side with an inserting groove (13), which accomodates the curved roof;

each shoulder part has a side edge (14) with an inserting groove (16), which accomodates a curved grating part (2);

the respective wires of the wall grating parts and roof grafting parts are held in the respective grooves of the shoulder parts by elastic cross-pieces (12,15) with barbs (12a, 15a).

2. A wire basket bird cage according to the conception of claim 1, characterized further by the following features:

for the connection of the roof (31) to each attached grating part a solid shoulder part (30) is provided;

the solid shoulder part (30) has an obtuse angled edge on the roof side with an inserting groove for accomodation of an obtuse angled roof;

the shoulder part (30) has an obtuse angled side edge with inserting groove for accomodation of an obtuse angled attached wall-grating part;

the attached wall-grating part consists of two plane sidewalls (32), which are obtuse angled connected by connecting-parts (20).

* * * * *